United States Patent
Okochi et al.

(10) Patent No.: US 7,179,565 B2
(45) Date of Patent: Feb. 20, 2007

(54) LITHIUM ION SECONDARY CELL

(75) Inventors: Masaya Okochi, Osaka (JP); Yutaka Kawatate, Hirakata (JP); Ryoichi Tanaka, Izumiotsu (JP); Kaoru Inoue, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 197 days.

(21) Appl. No.: 10/470,761

(22) PCT Filed: Nov. 25, 2002

(86) PCT No.: PCT/JP02/12283

§ 371 (c)(1),
(2), (4) Date: Jul. 31, 2003

(87) PCT Pub. No.: WO03/049216

PCT Pub. Date: Jun. 12, 2003

(65) Prior Publication Data

US 2004/0048158 A1  Mar. 11, 2004

(30) Foreign Application Priority Data

Dec. 6, 2001  (JP) .............................. 2001-373271

(51) Int. Cl.
*H01M 4/48* (2006.01)
(52) U.S. Cl. ................................. 429/231.6; 429/231.3
(58) Field of Classification Search ............. 429/231.3, 429/231.6
See application file for complete search history.

(56) References Cited

U.S. PATENT DOCUMENTS

| | | | |
|---|---|---|---|
| 5,538,814 A * | 7/1996 | Kamauchi et al. .......... | 429/303 |
| 6,156,432 A * | 12/2000 | Mabuchi et al. ............ | 428/408 |
| 6,482,547 B1 | 11/2002 | Yoon et al. | |
| 6,756,155 B1 * | 6/2004 | Kweon et al. ......... | 429/231.95 |
| 6,783,890 B2 * | 8/2004 | Kweon et al. ........... | 429/218.1 |
| 6,805,996 B2 * | 10/2004 | Hosoya ....................... | 429/94 |
| 2002/0037456 A1 | 3/2002 | Hosoya | |

FOREIGN PATENT DOCUMENTS

| | | |
|---|---|---|
| CN | 1237003 A | 12/1999 |
| EP | 0 997 960 | 5/2000 |
| JP | 05-054889 | 3/1993 |
| JP | 05-121066 | 5/1993 |
| JP | 05-217604 | 8/1993 |
| JP | 05-242891 | 9/1993 |
| JP | 05-307959 | 11/1993 |

(Continued)

OTHER PUBLICATIONS

Linden, D., "Handbook of Batteries," 2nd, McGraw-Hill, New York, 1995, pp. 36.22-37.*

*Primary Examiner*—Mark Ruthkosky
(74) *Attorney, Agent, or Firm*—McDermott Will & Emery LLP

(57) ABSTRACT

A lithium ion secondary battery comprising: a positive electrode; a negative electrode; and a non-aqueous electrolyte, the positive electrode comprising a positive electrode active material and a binder, the positive electrode active material comprising a lithium-containing composite oxide represented by the chemical formula:

$$Li_a(Co_{1-x-y}Mg_xM_y)_bO_c$$

where M is at least one selected from Ni, Mn and Al, $0 \leq a \leq 1.05$, $0.005 \leq x \leq 0.025$, $0 \leq y \leq 0.25$, $0.85 \leq b \leq 1.1$, and $1.8 \leq c \leq 2.1$.

7 Claims, 1 Drawing Sheet

FOREIGN PATENT DOCUMENTS

| | | |
|---|---|---|
| JP | 06-168722 | 6/1994 |
| JP | 10-001316 | 1/1998 |
| JP | 2000-235868 | 8/2000 |
| JP | P2001-319652 A | 11/2001 |
| JP | 2002-198051 | 7/2002 |
| JP | 2002-231246 | 8/2002 |
| JP | 2002-270176 | 9/2002 |

* cited by examiner

LITHIUM ION SECONDARY CELL

TECHNICAL FIELD

The present invention relates to a lithium ion secondary battery and especially to the positive electrode thereof.

BACKGROUND ART

In recent years, a rapidly increasing number of household electronic devices have become portable and cordless. There is currently an increasing demand for small-sized, light-weight batteries with high energy density to serve as power sources for operating those electric devices. In particular, lithium ion secondary batteries are expected to glow significantly in the future as power sources for notebook computers, mobile phones, audio-visual devices and the like since the batteries have high voltage and high energy density. Nickel-cadmium storage batteries or nickel-metal hydride storage batteries containing an alkaline aqueous electrolyte, which have been mainstream batteries, are being replaced with lithium ion secondary batteries.

As a positive electrode active material of a lithium ion secondary battery used for example has been a lithium-containing composite oxide such as $LiCoO_2$, $LiNiO_2$, $LiMnO_2$ or $LiMn_2O_4$. These positive electrode active materials repeatedly expand and contract by charging/discharging. This causes destruction of a crystal structure or cracking of particles, and thus repetition of charge/discharge cycles is followed by a decrease in capacity and an increase in internal resistance. In view of such a problem considered have been attempts to stabilize the crystal structure by replacement of part of cobalt or nickel in the composite oxide with a different element.

For example, Japanese Patent Publication No. 3162437, Japanese Laid-Open Patent Publication No. Hei 5-242891 and Japanese Laid-Open Patent Publication No. Hei 6-168722 report that replacement of part of cobalt in a composite oxide with a different element such as magnesium improves a cycle characteristic and safety of a battery. While being capable of suppressing deterioration in cycle characteristic, this operation however has a problem that, when a battery comprising the aforesaid positive electrode active material is stored in a charged state at 85° C. for 3 days, for example, an amount of gas generated increases. Especially in the case of a battery comprising a low-profile-rectangular or low-profile battery case, since the strength of the battery case is lower as compared to a cylindrical battery, the battery thickness increases due to the gas generation, to the extent of getting out of a specification.

Although the cause of the increase in amount of the gas generated has not been clarified up until now, it is considered that, since the positive electrode active material, where part of cobalt has been replaced with magnesium, has high electrical conductivity and the surface thereof is active, reactivity with a non-aqueous electrolyte is increased and decomposition of the non-aqueous electrolyte is promoted.

DISCLOSURE OF INVENTION

The present inventors made an industrious effort to study a content of magnesium in a positive electrode active material. As a result found was the content of magnesium at which the conductivity of the active material improves and an amount of gas to be generated during storage at high temperatures largely decreases, to accomplish the present invention.

Namely, the present invention relates to a lithium ion secondary battery comprising: a positive electrode; a negative electrode; and a non-aqueous electrolyte, the positive electrode comprising a positive electrode active material and a binder, the positive electrode active material comprising a lithium-containing composite oxide represented by the chemical formula:

$$Li_a(Co_{1-x-y}Mg_xM_y)_bO_c$$

where M is at least one selected from Ni, Mn and Al, $0 \leq a \leq 1.05$, $0.005 \leq x \leq 0.025$, $0 \leq y \leq 0.25$, $0.85 \leq b \leq 1.1$, and $1.8 \leq c \leq 2.1$.

In a preferable mode of the present invention, the lithium ion secondary battery further comprises a battery case for accommodating the positive electrode, the negative electrode and the non-aqueous electrolyte, and the battery case is low profile rectangular or low profile.

Examples of the battery case may include a battery can made of a metal plate and an outer jacket made of a laminate sheet.

The low-profile-rectangular battery may be exemplified by CGA533048, manufactured by Matsushita Battery Industrial Co., Ltd., but it is not limited thereto.

The present invention is effective especially when the battery case comprises aluminum or an alloy containing aluminum.

It is preferable that the positive electrode further comprises not more than 3 parts by weight of a conductive agent per 100 parts by weight of the positive electrode active material.

It is preferable that the binder is contained in the positive electrode in an amount not less than 1 part by weight and not more than 4 parts by weight, per 100 parts by weight of the positive electrode active material.

It is preferable that polyvinylidene fluoride is used as the binder. It is preferable that the weight-average molecular weight of polyvinylidene fluoride is not less than 150,000 and not more than 350,000.

The present invention is effective especially when the non-aqueous electrolyte comprises a non-aqueous solvent and a lithium salt. The present invention is also effective especially when the non-aqueous solvent comprises γ-butyrolactone and/or a γ-butyrolactone derivative.

It is preferable that the negative electrode comprises a carbon particle. It is also preferable that the carbon particle comprises a core particle and an amorphous carbon which covers at least part of the surface of the core particle, and the core particle comprises graphite.

The outer jacket made of a laminate sheet comprises, for example, metal foil and a resin layer disposed on at least one face of the metal foil. As the metal foil used for example is aluminum or an alloy containing aluminum.

The metal foil for example serves to cut off an electrolyte and moisture, and cut off light. The metal foil preferably has a thickness of 20 to 50 μm.

As for the resin layer outside the jacket material preferably used are polyethylene terephthalate, polyimide, methyl polymethacrylate, polyamide processed by drawing, and the like, each having a thickness of 10 to 50 μm, from the viewpoint of securing the resistance to electrolyte, as well as the mechanical strength, of the jacket material. These resins may be used singly or in combination of two or more of them.

The resin layer inside the jacket material preferably used are a polyolefin resin, an acid-denatured polyolefin resin, and the like, each having a thickness of 20 to 50 μm, from the perspective of securing a thermal adhering property as well as an insulating property for preventing a short circuit. Examples of the polyolefin resin may include polyethylene, polypropylene, and a polyethylene-polypropylene copolymer.

According to the present invention, it is possible to provide a lithium ion secondary battery with a small amount of gas to be generated during storage at high temperatures and an excellent rate characteristic.

According to the present invention, it is also possible to suppress an increase in thickness of a battery during storage at high temperatures even when a battery case with low strength is used.

BEST MODE FOR CARRYING OUT THE INVENTION

Figure 1:
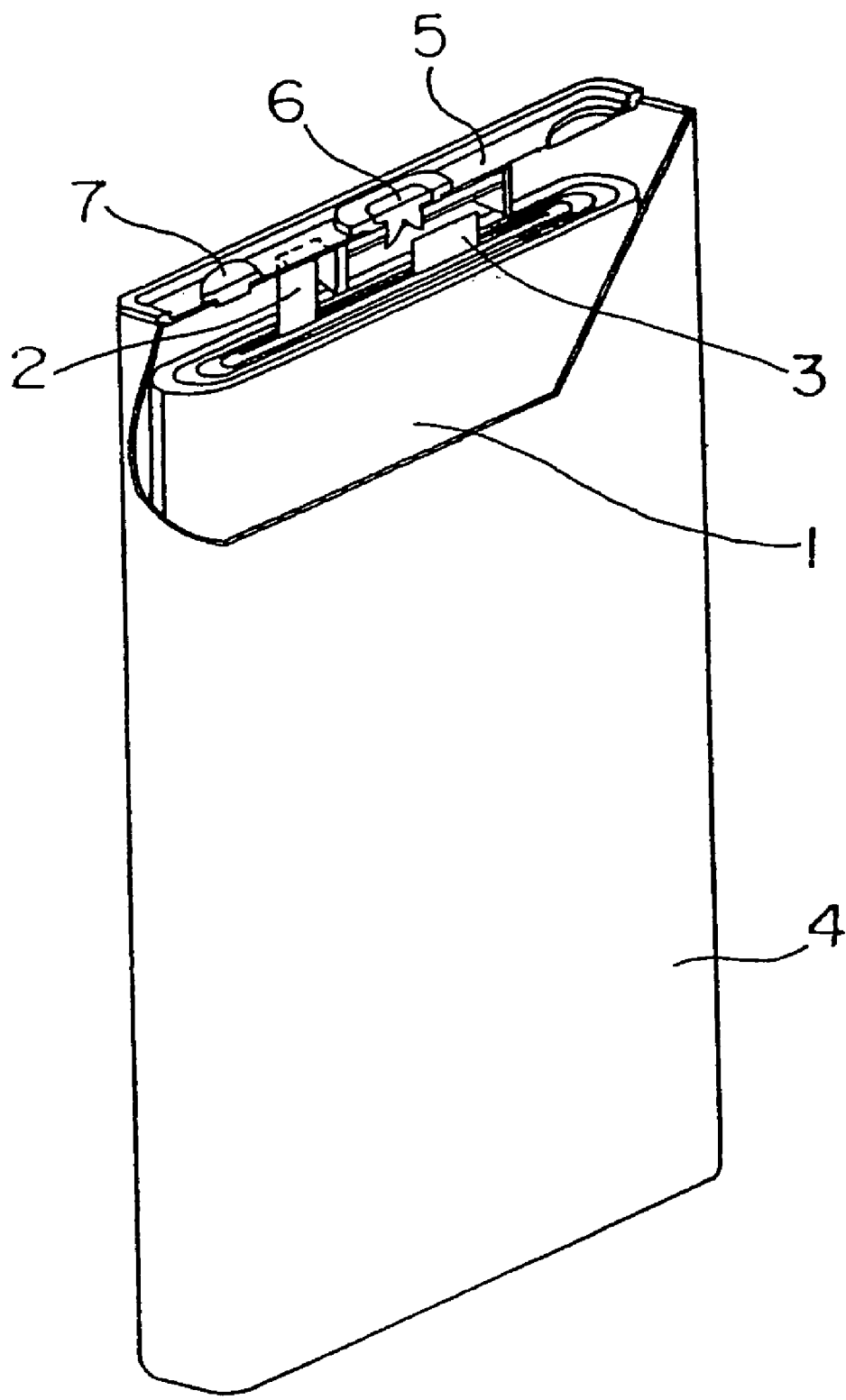
FIG. 1 is a partially cut-away oblique view of one example of low-profile-rectangular batteries in the present invention.

In the present invention, a positive electrode active material is used which comprises a lithium-containing composite oxide represented by the chemical formula:

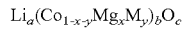

$Li_a(Co_{1-x-y}Mg_xM_y)_bO_c$ where M is at least one selected from Ni, Mn and Al, $0 \leq a \leq 1.05$, $0.005 \leq x \leq 0.025$, $0 \leq y \leq 0.25$, $0.85 \leq b \leq 1.1$, and $1.8 \leq c \leq 2.1$.

When a value x that shows a content of magnesium drops to below 0.005, the content of magnesium gets too small to sufficiently improve the conductivity of the active material, and thereby the rate characteristic is not improved. When the value x exceeds 0.025, on the other hand, the amount of gas generated after storage at high temperatures increases, raising a large problem of expansion of the battery, especially with a low-profile-rectangular battery comprising a battery can made of aluminum or aluminum alloy or a low-profile battery comprising an outer jacket made of a laminate sheet. When the value x that shows the content of magnesium is $0.005 \leq x \leq 0.025$, therefore, a positive electrode active material having high conductivity, with which a small amount of gas is generated during storage at high temperatures, is obtained.

The composite oxide is capable of containing at least one selected from Ni, Mn and Al, as the element M. A composite oxide containing Ni can be manufactured at low cost and it improves thermal resistance. Further, a composite oxide containing Mn and/or Al improves thermal resistance, thereby improving the cycle characteristic of the battery. However, when a value y that shows a content of the element M exceeds 0.25, the following demerit occurs. That is, with excessive Ni, the cycle life characteristic of the battery decreases and the amount of gas to be generated during storage at high temperatures increases. Further, with excessive Mn and/or Al, a charge/discharge capacity of the active material decreases and a tap density of the active material particles decreases, causing a decrease in positive electrode capacity. Accordingly, the value y that shows the content of M needs to satisfy $0 \leq y \leq 0.25$.

The positive electrode active material can be obtained by, for example, baking at least a lithium salt, a magnesium salt and a cobalt salt under an oxidizing atmosphere at high temperatures. As materials for synthesizing the positive electrode active material, the following can be employed.

As the lithium salt used can be lithium carbonate, lithium hydroxide, lithium nitrate, lithium sulfate, lithium oxide and the like.

As the magnesium salt used can be magnesium oxide, basic magnesium carbonate, magnesium chloride, magnesium fluoride, magnesium nitrate, magnesium sulfate, magnesium acetate, magnesium oxalate, magnesium sulfide, magnesium hydroxide and the like.

As the cobalt salt used can be cobalt oxide, cobalt hydroxide and the like.

The positive electrode active material can also be obtained by preparing cobalt hydroxide containing magnesium and the element M by coprecipitation, mixing prepared cobalt hydroxide with the lithium salt, and then baking the mixture.

A positive electrode mixture can be obtained by mixing the positive electrode active material with a binder, a dispersion medium and the like. Further, the positive electrode mixture preferably contains a small amount of a conductive agent.

As for the conductive agent, any electric conductive material which causes no chemical change within a constituted battery can be used. Employed for example can be carbon blacks such as acetylene black, Ketjen black, channel black, furnace black, lamp black and thermal black, natural graphite such as flake graphite, artificial graphite, conductive carbon fiber, and the like. These can be used singly or in combination of two or more or them. Among these conductive agents, carbon black, a graphite powder and carbon fiber are particularly preferred.

Since the positive electrode active material used in the present invention has high conductivity, the conductive agent is contained in the positive electrode mixture preferably in an amount not more than 3.0 parts by weight per 100 parts by weight of the positive electrode active material. This decreases decomposition of the non-aqueous electrolyte on the surface of the conductive agent during battery storage at high temperatures, thereby suppressing decrease in capacity after storage at high temperatures. Further, with a small amount of the conductive agent, an amount of the binder necessary for covering the conductive agent can be reduced. Specifically, even with the amount of the binder reduced to 4 parts by weight or less per 100 parts by weight of the positive electrode active material, a sufficient strength can still be given to the electrode plate. Moreover, the reduction in insulating binder produces a synergistic effect that the load characteristic of the battery improves and the cycle characteristic also improves. When the amount of the binder is reduced to below 1 part by weight per 100 parts by weight of the positive electrode active material, however, it becomes difficult to obtain the sufficient strength of the electrode plate.

As the binder, either a thermoplastic resin or a thermosetting resin may be used and they can also be used in combination. Among them, polyvinylidene fluoride (PVdF) and polytetrafluoroethylene (PTFE) are preferred and PVdF is particularly preferred. When PVdF with a molecular weight of 150,000 or more is used, in particular, binding strength improves to obtain the sufficient electrode plate strength even with an extremely small amount of PVdF. In this case, the insulating binder can further be reduced so that a synergistic effect that the load characteristic of the battery further improves and the cycle characteristic significantly improves can be obtained. When the molecular weight of PVdF is 350,000 or more, on the other hand, there is a tendency that the load characteristic begins to decrease and the cycle characteristic gradually decreases.

As the dispersion medium used can be an aqueous dispersion medium and an organic dispersion medium such as N-methyl-2-pyrrolidone.

The non-aqueous electrolyte used in the present invention preferably comprises a non-aqueous solvent and a lithium salt dissolved in the solvent. Examples of the non-aqueous solvent may include cyclic carbonates such as ethylene carbonate, propylene carbonate, butylene carbonate and vinylene carbonate, non-cyclic carbonates such as dimethyl carbonate, diethyl carbonate, ethyl methyl carbonate and dipropyl carbonate, aliphatic carboxylic acid esters such as methyl formate, methyl acetate, methyl propionate and ethyl propionate, γ-butyrolactone, γ-butyrolactone derivatives such as γ-valerolactone, α-methyl-γ-butyrolactone, non-cyclic ether such as 1,2-dimethoxyethane, cyclic ethers such as tetrahydrofuran, and aprotic organic solvents such as dimethylsulfoxide, 1,3-dioxolane, formamide, acetamide, dimethylformamide, dioxolane, acetonitril, propionitril, nitromethane, ethyl monoglyme, triester phosphate, trimethoxymethane, dioxolane derivatives, sulfolane, methyl sulfolane, 1,3-dimethyl-2-imidazolidione, 3-methyl-2-oxazolidione, propylene carbonate derivatives, tetrahydrofuran derivatives, ethylether, 1,3-propane sultone, anisole, dimethyl sulfoxide and N-methyl-2-pyrrolidone. These can be used singly or in combination of two or more of them.

It is preferable that γ-butyrolactone or a γ-butyrolactone derivative is contained in the non-aqueous solvent. The positive electrode active material in accordance with the present invention, when combined with a normally heavily-used non-aqueous electrolyte containing cyclic carbonate or non-cyclic carbonate, has a tendency to cause an increased amount of gas generation during storage at high temperatures. In the case of a non-aqueous electrolyte containing γ-butyrolactone or a γ-butyrolactone derivative, on the other hand, the gas generation during storage at high temperatures is suppressed to be in a small amount. Presumably, this is because γ-butyrolactone or a γ-butyrolactone derivative forms a film on the positive electrode surface so as to suppress the gas generation reaction.

Such an effect can be obtained when a content of γ-butyrolactone or a γ-butyrolactone derivative in the non-aqueous solvent is not less than 0.5 wt %. With the content of γ-butyrolactone below 0.5 wt %, the film is insufficiently formed on the positive electrode surface during storage at high temperatures and hence the aforesaid effect cannot be obtained.

In the present invention particularly preferred as the solvent is a mixed solvent of γ-butyrolactone, vinylene carbonate and cyclic carbonate, and non-cyclic carbonate may further be contained. The content of vinylene carbonate in the mixed solvent is preferably not more than 20% by volume, and more preferably not more than 5% by volume.

The lithium salt to dissolve in the non-aqueous solvent may be exemplified by $LiClO_4$, $LiBF_4$, $LiPF_6$, $LiAlCl_4$, $LiSbF_6$, Lisbon, LiCl, $LiCF_3SO_3$, $LiCF_3Co_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, and chloroborane lithium. These may be used singly or in combination of two or more of them. Further, it is preferable that at least $LiPF_6$ is used.

The concentration of the lithium salt in the non-aqueous electrolyte is not particularly limited; however, the preferable concentration is from 0.2 to 2 mol/liter, and the particularly preferable concentration is from 0.5 to 1.5 mol/liter.

As the negative electrode used in the present invention, a material capable of absorbing and desorbing lithium ions can be used without any particular limitation. As a preferable negative electrode material mentioned for example can be lithium alloys, carbonaceous materials, inorganic oxides, inorganic chalcogenide, nitride, metal complexes and organic polymer compounds. These may be used singly or in combination of two or more of them. For example, a combination of lithium and a carbonaceous material, a combination of lithium and an inorganic oxide, a combination of lithium, a carbonaceous material and an inorganic oxide, and the like, are preferred. By the use of these negative electrode materials, a battery can be provided with high capacity, high discharge potential, high-level safety and an excellent cycle characteristic.

As the lithium alloys mentioned can be Li—Al, Li—Al—Mn, Li—Al—Mg, Li—Al—Sn, Li—Al—In, Li—Al—Cd, Li—Al—Te, Li—Ga, Li—Cd, Li—In, Li—Pb, Li—Bi, Li—Mg and the like. It is preferable that the content of lithium in the lithium alloy is 10 wt % or more.

As the carbonaceous materials mentioned can be coke, pyrolytic carbon, natural graphite, artificial graphite, mesocarbon microbeads, graphitized mesophase microspheres, gas phase grown carbon fiber, vitrified carbons, polyacrylonitrile type, pitch type and cellulose type carbon fiber, gas phase grown carbon fiber, amorphous carbon, baked organic substances, and the like. These may be used singly or in combination of two or more of them. It is to be noted that the carbonaceous material may contain, in addition to carbon, dissimilar elements or compounds, such as O, B, P, N, S, SiC and $B_4C$. The content of the dissimilar element or the compound is preferably from 0 to 10 wt %.

As the inorganic oxides mentioned for example can be titanium oxide, tungsten oxide, molybdenum oxide, niobium oxide, vanadium oxide and iron oxide. Further, as the inorganic chalcogenides mentioned for example can be iron sulfide, molybdenum sulfide and titanium sulfide. As the organic polymer compounds mentioned can be polymer compounds such as polythiophene and polyacetylene. As the nitride mentioned can be cobalt nitride, copper nitride, nickel nitride, iron nitride, manganese nitride and the like. Among these negative electrode materials, the carbonaceous material is particularly preferred.

Moreover, among the carbonaceous materials, a carbon particle comprising a core particle which comprises graphite and amorphous carbon which covers at least part of the core particle surface is particularly preferred. In this carbon particle, the core particle and the amorphous carbon are preferably in a weight ratio of 98:2 to 70:30 from the perspective of capacity. In the case of using this carbon particle, magnesium eluted from the positive electrode is taken into the amorphous carbon in the surface of the carbon particle, thereby allowing prevention of deterioration in negative electrode characteristic caused by magnesium insertion in between graphite layers. This further improves the capacity decrease after storage at high temperatures.

A negative electrode mixture can be obtained by mixing the negative electrode material with a binder, a dispersion medium and the like. As for the binder and the dispersion medium, the same ones as those used in preparation of the positive electrode can be used.

The positive electrode can be obtained by applying the positive electrode mixture onto a current collector comprising, for example, metal foil, followed by pressing and drying. Further, the negative electrode can be obtained by applying the negative electrode mixture onto the current collector comprising, for example, metal foil, followed by pressing and drying. When the positive electrode and the negative electrode are in sheet form, the mixture layer is preferably disposed on each face of the current collector. It should be noted that the mixture layer on one of the faces may be constituted by plural layers. There may be comprised, in addition to the mixture layer, a protective layer containing no active material, a base coat layer to be disposed on the current collector, an intermediate layer to be disposed between the mixture layers, and the like.

In the following, the present invention is described on the basis of examples, referring to a drawing.

FIG. 1 shows a partially cut-away oblique view of a low-profile-rectangular lithium ion secondary battery fabricated in the example. It is to be noted that, although a low-profile-rectangular lithium ion secondary battery is fabricated here, the shape of the battery of the present invention is not limited thereto. The present invention is applicable to, for example, low-profile, cylindrical type, coin type, button type, sheet type, laminated type, flat type batteries, and large-sized batteries for use in electric automobiles and the like.

EXAMPLE 1

Consideration of Content of Magnesium (i) Preparation of Positive Electrode Active Material A mixed aqueous solution, containing cobalt sulfate and magnesium sulfate dissolved therein at respectively prescribed concentrations, was successively provided into a reaction vessel, and then a sodium hydoxide aqueous solution was successively added dropwise into the reaction vessel to adjust pH of the aqueous solution to be 10 to 13 so that a precursor of an active material, namely a hydroxide comprising $(Co_pMg_q)(OH)_2$, was synthesized. The values of p and q are shown in table 1.

This precursor was mixed with lithium carbonate such that the molar ratio of lithium, cobalt and magnesium were 1:p:q, and the resultant mixture was temporarily baked at 600° C. for 10 hours and then grinded. Subsequently, the grinded baked matter was baked at 900° C., again for 10 hours, which was then grinded and sieved to obtain a positive electrode active material represented by the chemical formula: $Li(Co_pMg_q)O_2$.

In a comparative example, $LiCoO_2$ having been fabricated in an ordinary fabrication method was used.

(ii) Preparation of Positive Electrode

Per 100 parts by weight of this positive electrode active material, 4.0 parts by weight of acetylene black as a conductive agent was mixed, to which a solution, given by dissolving 2 parts by weight of polyvinylidene fluoride (PVdF) with a weight-average molecular weight of 300,000 as a binder, in a prescribed amount of N-methyl-2-pyrrolidone, was further added, followed by stirring and mixing, to obtain a paste-like positive electrode mixture. The positive electrode mixture was applied onto each face of a current collector made of aluminum foil with a thickness of 15 μm and dried, and the whole was rolled by pressure with a roller and then cut into prescribed sizes, to obtain a positive electrode.

(iii) Preparation of Negative Electrode

Per 100 parts by weight of flake graphite with a mean particle size of 20 μm, an aqueous solution, given by dissolving 1 part by weight of carboxy methyl cellulose as a thickener in a prescribed amount of water, was mixed, and 2 parts by weight of styrene-butadiene rubber as a binder was added, which was then stirred and mixed to obtain a paste-like negative electrode mixture. The negative electrode mixture was applied onto each face of a current collector made of copper foil with a thickness of 10 μm and dried, and the whole was rolled by pressure with a roller, and then cut into prescribed sizes to obtain a negative electrode.

(iv) Assembly of Battery

The prepared positive electrode and negative electrode were wound up via a separator comprising fine porous polyethylene with a thickness of 20 μm so as to have an oval cross section, for constituting an electrode plate assembly 1. One end of a positive electrode lead 2 and one end of a negative electrode lead 3 were welded to the positive electrode and the negative electrode, respectively. An insulating ring made of a polyethylene resin was attached to the upper part of the electrode plate assembly 1, which was then inserted into a low-profile-rectangular case 4 made of aluminum, as shown in FIG. 1. The insulating ring is not shown in FIG. 1. The other end of the positive electrode lead 2 was spot-welded to a sealing plate 5 made of aluminum. The other end of the negative electrode lead 3 was spot-welded to the lower part of a negative electrode terminal 6 made of nickel placed in the central part of the sealing plate 5. An open end part of the battery case 4 was laser-welded to the sealing plate 5, and a prescribed amount of a non-aqueous electrolyte was poured in from an inlet in the sealing plate. Finally, the inlet was sealed with a sealing stopper 7 made of aluminum and then laser-welded.

The non-aqueous electrolyte was prepared by dissolving $LiPF_6$, at a concentration of 1.0 mol/l, in a mixed solvent of ethylene carbonate and ethyl methyl carbonate in a volume ratio of 1:3.

The completed battery was a 533048 type battery, namely a battery with a width of 30 mm, a height of 48 mm and a thickness of 5.3 mm. The battery was designed so as to have a capacity of 700 mAh when $LiCoO_2$ was used as the positive electrode active material.

[Evaluation of Battery]

The characteristics of the battery obtained in Example 1 were compared.

(i) Rate Characteristic

First, in an environment of 20° C., two cycles of fixed voltage charging, at a charging voltage of 4.20 V and a maximum charging current of 700 mA, and a fixed current discharging, at a discharging current of 700 mA and a terminal discharging voltage of 3.0 V, were performed, and a discharge capacity on the second cycle (hereinafter referred to as a discharge capacity A) was confirmed.

Thereafter, a battery charged on the same conditions as above was discharged on the same conditions as on the second cycle, except that the discharging current was 1,400 mA, and a discharge capacity (hereinafter referred to as a discharge capacity B) was confirmed.

Ratios(%) of the discharge capacities B to the discharge capacities A were calculated to compare the rate characteristics. The results are shown in Table 1.

(ii) High Temperature Storage Characteristic

Subsequently, one charge/discharge cycle was performed in the same conditions as on the second cycle to again charge the battery. The battery in a charged state was then stored at 85° C. for 3 days. The battery after the storage was again subjected to two cycles of the charge/discharge at 20° C. in the same conditions as above, to determine a capacity maintenance ratio after the high temperature storage. Ratios of the discharge capacities on the second cycle after the high temperature storage, calculated on the assumption that the discharge capacity before the storage was 100%, are shown in Table 1 as capacity maintenance ratios.

Furthermore, the battery after the storage was stood to be cooled off and then the battery thickness was measured to determine an increase in thickness (unit: mm) from the battery before the storage. The results are shown in Table 1.

TABLE 1

| | p:q | Capacity maintenance ratio (%) | Increase of battery thickness after storage (mm) | Rate characteristic (%) |
|---|---|---|---|---|
| Battery a | 1:0 | 82 | 0.29 | 79 |
| Battery b | 0.995:0.005 | 81 | 0.37 | 90 |
| Battery c | 0.99:0.01 | 80 | 0.48 | 91 |
| Battery d | 0.98:0.02 | 80 | 0.59 | 92 |
| Battery e | 0.975:0.025 | 76 | 1.02 | 93 |
| Battery f | 0.97:0.03 | 75 | 1.33 | 94 |
| Battery g | 0.95:0.05 | 70 | 2.04 | 94 |

Comparison of the battery characteristics of Batteries a to g indicates that favorable results were obtained in terms of both the capacity maintenance ratio after the high temperature storage and the battery thickness after the storage when the positive electrode active material was used which was added with magnesium in the range of 0.5 to 2.5 mol % with respect to the total amount of cobalt and magnesium.

Battery a, to which no magnesium had been added, had a favorable capacity maintenance ratio and battery thickness after the storage, but had a lower rate characteristic as compared to Batteries b to g, to which magnesium had been added.

Further, Batteries f to g with an excessive amount of magnesium added thereto exhibited unsatisfactory results as having low capacity maintenance ratios and battery thicknesses that increased by 1.3 mm or more after the storage.

EXAMPLE 2

Consideration of Amount of Conductive Agent

Except that the amount of the conductive agent (wt %) with respect to the weight of the active material was changed as shown in Table 2, batteries were fabricated using the active material of Battery d which had obtained highly favorable characteristics in Example 1 and tested in the same manner as in Example 1. The results are shown in Table 2.

TABLE 2

| | Conductive agent amount (wt %) | Capacity maintenance ratio (%) | Increase of battery thickness after storage (mm) |
|---|---|---|---|
| Battery h | 0 | 77 | 0.25 |
| Battery i | 1 | 81 | 0.32 |
| Battery j | 2 | 82 | 0.42 |
| Battery k | 3 | 81 | 0.51 |
| Battery l | 5 | 75 | 1.12 |

In Table 2, the capacity maintenance ratio is highest when the amount of the conductive agent was 2 wt % with respect to the amount of the active material, and then the capacity maintenance ratio becomes lower in the order of the amount of the conductive agent of 1 or 3 wt %, 0 wt % and 5 wt %. When the amount of the conductive agent was 0 wt %, the capacity maintenance ratio was relatively low, presumably because a decomposition product of the non-aqueous electrolyte adhered to the active material surface, thereby decreasing the conductivity of the positive electrode. Meanwhile, the capacity maintenance ratio is lower when the amount of the conductive agent was 3 wt % and 5 wt %, as compared to 2 wt %, presumably because a side reaction such as decomposition of the non-aqueous electrolyte occurred and the decomposition product adhered to the conductive agent surface, thereby decreasing the conductivity. In terms of the battery thickness, on the other hand, the smaller the amount of the conductive agent, the smaller the change in thickness and thus the more favorable results were obtained. It can be considered from the aforesaid results that when the amount of the conductive agent was not more than 3 wt % with respect to the amount of the active material, a favorable result can generally be obtained.

EXAMPLE 3

Consideration of Amount of Binder

Except that the amount of the binder (wt %) with respect to the weight of the active material was changed as shown in Table 3, batteries were fabricated using the active material of Battery d which had obtained highly favorable characteristics in Example 1 and tested in the same manner as in Example 1. The results are shown in Table 3.

TABLE 3

| | Binder amount (wt %) | Capacity maintenance ratio (%) | Increase of battery thickness after storage (mm) | Rate characteristic (%) |
|---|---|---|---|---|
| Battery m | 0.5 | 70 | 0.62 | 92 |
| Battery n | 1 | 75 | 0.60 | 92 |
| Battery o | 4 | 83 | 0.58 | 90 |
| Battery p | 5 | 83 | 0.55 | 84 |

In Table 3, from the perspective of the capacity maintenance ratio, the more favorable results were obtained with a grater amount of the binder. However, Battery p in which the amount of the binder was 5 wt % with respect to the amount of the active material exhibited an insufficient rate characteristic. This is because, with the greater amount of the binder that covers the surfaces of the active material and the conductive agent, a side reaction is suppressed in a greater deal, increasing the capacity maintenance ratio, but also increasing polarization, which results in the decreased rate characteristic. From the viewpoint of the battery thickness, on the other hand, the greater the amount of the binder, the less the change in thickness and the more favorable results are obtained. It is thought from the aforesaid results that, when the amount of the binder with respect to the amount of the active material is from 1 to 4 wt %, a favorable result can generally be obtained.

EXAMPLE 4

Consideration of Molecular Weight of Binder

Except that the weight-average molecular weight of the binder was changed as shown in Table 4, batteries were fabricated using the active material of Battery d which had obtained highly favorable characteristics in Example 1 and tested in the same manner as in Example 1. The results are shown in Table 4.

TABLE 4

| | Binder molecule weight | Capacity maintenance ratio (%) | Increase of battery thickness after storage (mm) | Rate characteristic (%) |
|---|---|---|---|---|
| Battery q | 100000 | 72 | 0.63 | 92 |
| Battery r | 150000 | 79 | 0.61 | 92 |
| Battery s | 350000 | 78 | 0.59 | 90 |
| Battery t | 400000 | 76 | 0.55 | 83 |

In Table 4, from the standpoint of the capacity maintenance ratio and the like, when the weight-average molecular weight of the binder is not less than 150,000, a favorable result is obtained. However, a battery t with a weight-average molecular weight of the binder of 400,000 exhibited an insufficient rate characteristic. On the other hand, there was observed not much difference in battery thickness according to different molecular weights of the binder. It is thought from the aforesaid results that the preferable weight-average molecular weight of the binder is not less than 150,000 and not more than 350,000.

EXAMPLE 5

Consideration of Non-Aqueous Solvent

Except for the use of a non-aqueous electrolyte given by mixing the mixed solvent of ethylene carbonate and ethyl methyl carbonate in a volume ratio of 1:3, γ-butyrolactone (GBL) and vinylene carbonate and then dissolving $LiPF_6$, at a concentration of 1.0 mol/l, in each of the obtained four kinds of solvents, Batteries u to x were fabricated in the same manner as in the case of Battery d in Example 1. Batteries u to x were subjected to the same test as in Example 1. The results are shown in Table 5. It should be noted that the contents of GBL in the mixed solvent are as shown in Table 5. The content of vinylene carbonate in the mixed solvent was 2% by volume.

TABLE 5

| | GBL content (wt %) | Capacity maintenance ratio (%) | Increase of battery thickness after storage (mm) |
|---|---|---|---|
| Battery u | 0.5 | 81 | 0.31 |
| Battery v | 30 | 82 | 0.22 |
| Battery w | 70 | 84 | 0.19 |
| Battery x | 80 | 85 | 0.18 |

As a result of Table 5, in the case of using the non-aqueous electrolyte given by mixing γ-butyrolactone into the non-aqueous solvent, favorable characteristics were obtained in terms of both the capacity maintenance ratio and the battery thickness. Presumably, this is because the gas generation during the storage could be reduced. Moreover, as a result of consideration of the content of γ-butyrolactone in the non-aqueous solvent, it was found that the effect of suppressing the increase in battery thickness could be obtained when the content was not less than 0.5 wt %.

EXAMPLE 6

Consideration of Negative Electrode Carbonaceous Material 95 parts by weight of flake graphite with a mean particle size of 20 μm was mixed with 5 parts by weight of petroleum pitch and baked at 800° C. for 3 hours so that at least part of the surface of the flake graphite particle was covered with an amorphous carbon. Except that the carbonaceous material thus obtained was used in place of flake graphite, Battery y was fabricated in the same manner as in the case of Battery d in Example 1. Battery y was subjected to the same test as in Example 1. The results were shown in Table 6.

TABLE 6

| | Capacity maintenance ratio (%) | Increase of battery thickness after storage (mm) |
|---|---|---|
| Battery y | 85 | 0.51 |

From the results in Table 6, Battery y obtained more favorable characteristics in terms of both the capacity maintenance ratio and the battery thickness as compared to the battery using flake graphite for the negative electrode thereof. Presumably, this is because deterioration in negative electrode was suppressed by covering of the graphite surface with the amorphous carbon.

EXAMPLE 7

Consideration of Addition of Element M to Positive Electrode Active Material

Except that, in place of the mixed aqueous solution containing cobalt sulfate and magnesium sulfate dissolved therein, a mixed aqueous solution, containing cobalt sulfate, magnesium sulfate and any one of nickel sulfate, aluminum sulfate and manganese sulfate dissolved therein at prescribed concentrations, a precursor of an active material was synthesized in the same manner as in Example 1. Subsequently, the precursor was mixed with lithium carbonate in a prescribed molar ratio and the resultant mixture was subjected to the same operation as in Example 1, to obtain positive electrode active materials represented by the chemical formulae listed in Table 7.

Batteries z and A to Y were fabricated in the same manner as in the case of Battery d in Example 1, except that the positive electrode active materials shown in Table 7 were used. The results are shown in Table 7.

TABLE 7

| | Positive electrode active material | Capacity maintenance ratio (%) | Increase of battery thickness after storage (mm) |
|---|---|---|---|
| Battery z | $LiCo_{0.93}Mg_{0.02}Ni_{0.05}O_2$ | 79 | 0.65 |
| Battery A | $LiCo_{0.88}Mg_{0.02}Ni_{0.10}O_2$ | 78 | 0.72 |
| Battery B | $LiCo_{0.78}Mg_{0.02}Ni_{0.20}O_2$ | 76 | 0.84 |
| Battery C | $LiCo_{0.73}Mg_{0.02}Ni_{0.25}O_2$ | 74 | 0.98 |
| Battery D | $LiCo_{0.68}Mg_{0.02}Ni_{0.30}O_2$ | 68 | 1.25 |
| Battery E | $LiCo_{0.93}Mg_{0.02}Al_{0.05}O_2$ | 81 | 0.58 |
| Battery F | $LiCo_{0.83}Mg_{0.02}Al_{0.15}O_2$ | 83 | 0.57 |
| Battery G | $LiCo_{0.73}Mg_{0.02}Al_{0.25}O_2$ | 84 | 0.59 |
| Battery H | $LiCo_{0.68}Mg_{0.02}Al_{0.30}O_2$ | 86 | 0.55 |
| Battery I | $LiCo_{0.93}Mg_{0.02}Mn_{0.05}O_2$ | 82 | 0.57 |
| Battery J | $LiCo_{0.83}Mg_{0.02}Mn_{0.15}O_2$ | 83 | 0.56 |
| Battery K | $LiCo_{0.73}Mg_{0.02}Mn_{0.25}O_2$ | 85 | 0.59 |
| Battery L | $LiCo_{0.68}Mg_{0.02}Mn_{0.30}O_2$ | 86 | 0.55 |
| Battery M | $LiCo_{0.94}Mg_{0.01}Ni_{0.05}O_2$ | 80 | 0.55 |
| Battery N | $LiCo_{0.89}Mg_{0.01}Ni_{0.10}O_2$ | 78 | 0.62 |
| Battery O | $LiCo_{0.79}Mg_{0.01}Ni_{0.20}O_2$ | 76 | 0.73 |
| Battery P | $LiCo_{0.74}Mg_{0.01}Ni_{0.25}O_2$ | 75 | 0.88 |
| Battery Q | $LiCo_{0.69}Mg_{0.01}Ni_{0.30}O_2$ | 67 | 1.20 |
| Battery R | $LiCo_{0.94}Mg_{0.01}Al_{0.05}O_2$ | 82 | 0.49 |

TABLE 7-continued

| Positive electrode active material | Capacity maintenance ratio (%) | Increase of battery thickness after storage (mm) |
|---|---|---|
| Battery S  LiCo$_{0.84}$Mg$_{0.01}$Al$_{0.15}$O$_2$ | 84 | 0.50 |
| Battery T  LiCo$_{0.74}$Mg$_{0.01}$Al$_{0.25}$O$_2$ | 85 | 0.51 |
| Battery U  LiCo$_{0.69}$Mg$_{0.01}$Al$_{0.30}$O$_2$ | 86 | 0.50 |
| Battery V  LiCo$_{0.94}$Mg$_{0.01}$Mn$_{0.05}$O$_2$ | 83 | 0.50 |
| Battery W  LiCo$_{0.84}$Mg$_{0.01}$Mn$_{0.15}$O$_2$ | 84 | 0.51 |
| Battery X  LiCo$_{0.74}$Mg$_{0.01}$Mn$_{0.25}$O$_2$ | 85 | 0.52 |
| Battery Y  LiCo$_{0.69}$Mg$_{0.01}$Mn$_{0.30}$O$_2$ | 86 | 0.49 |

Since Batteries z, A to C and M to P each used a positive electrode active material added with nickel, material cost of those batteries could be reduced. Further, the battery characteristics of those batteries were almost the same as the battery characteristics of Battery d whose positive electrode active material was not added with nickel. Considering that the characteristics of Batteries D and Q decreased, however, the optimum amount of nickel added was from 5 to 25 mol % with respect to the total amount of cobalt, magnesium and nickel.

Since Batteries E to H and R to U each used a positive electrode active material added with aluminum, the capacity of the positive electrode active material itself decreased and, for example, the capacity of Battery E decreased by 5% from that of Battery d, while the capacity maintenance ratio of Battery E improved.

When 30 mol % of aluminum was added with respect to the total amount of cobalt, magnesium and aluminum, like Batteries H and U, however, the battery capacity decreased by as much as 15%. Hence the optimum amount of aluminum added was not more than 25 mol % with respect to the total amount of cobalt, magnesium and aluminum.

Batteries I to L and V to Y each using a positive electrode active material added with manganese exhibited almost equivalent characteristics and tendencies to those of Batteries E to H and R to U each using a positive electrode active material added with aluminum

INDUSTRIAL APPLICABILITY

In the present invention, a positive electrode active material is used which is represented by the chemical formula:

$$Li_a(Co_{1-x-y}Mg_xM_y)_bO_c$$

where M is at least one selected from Ni, Mn and Al, $0 \leq a \leq 1.05$, $0.005 \leq x \leq 0.025$, $0 \leq y \leq 0.25$, $0.85 \leq b \leq 1.1$, and $1.8 \leq c \leq 2.1$. Therefore, according to a preferable embodiment of the present invention, there can be provided a highly-reliable lithium ion secondary battery with an excellent rate characteristic in which decreases in capacity and amount of gas to be generated due to storage at high temperatures are small and whose expansion due to gas generation is also small.

The invention claimed is:

1. A lithium ion secondary battery comprising: a positive electrode; a negative electrode; and a non-aqueous electrolyte,
said positive electrode comprising a positive electrode active material and a binder,
said positive electrode active material comprising a lithium-containing composite oxide represented by the chemical formula:

$$Li_a(Co_{1-x-y}Mg_xM_y)_bO_c$$

wherein M is at least one selected from Ni, Mn and Al, $0 < a \leq 105$, $0.005 \leq x \leq 0.025$, $0 \leq y \leq 0.25$, $0.85 \leq b \leq 1.1$, and
$1.8 \leq c \leq 2.1$, and
said positive electrode comprises not more than 3 parts by weight of a conductive agent per 100 parts by weight of said positive electrode active material, wherein said negative electrode comprises a carbon particle, said carbon particle comprises a core particle and an amorphous carbon which covers at least part of the surface of said core particle, and said core particle comprises graphite.

2. The lithium ion secondary battery in accordance with claim 1, further comprising a battery case for accommodating said positive electrode, said negative electrode and said non-aqueous electrolyte, wherein said battery case is low profile rectangle or low profile.

3. The lithium ion secondary battery in accordance with claim 2, wherein said battery case comprises aluminum or an alloy containing aluminum.

4. The lithium ion secondary battery in accordance with claim 1, wherein said binder is contained in said positive electrode in an amount not less than 1 part by weight and not more than 4 parts by weight, per 100 parts by weight of said positive electrode active material.

5. The lithium ion secondary battery in accordance with claim 1, wherein said binder comprises polyvinylidene fluoride, and the weight-average molecular weight of said polyvinylidene fluoride is not less than 150,000 and not more than 350,000.

6. The lithium ion secondary battery in accordance with claim 1, wherein said non-aqueous electrolyte comprises a non-aqueous solvent and a lithium salt, and said non-aqueous solvent comprises γ-butyrolactone and/or a y-butyrolactone derivative.

7. A lithium ion secondary battery comprising: a positive electrode; a negative electrode; and a non-aqueous electrolyte,
said positive electrode comprising a positive electrode active material and a binder,
said positive electrode active material comprising a lithium-containing composite oxide represented by the chemical formula:

$$Li_a(Co_{1-x-y}Mg_xM_y)_bO_c$$

wherein M is at least one selected from Ni, Mn and Al, $0 < a \leq 105$, $0.005 \leq x \leq 0.020$, $0 \leq y \leq 0.25$, $0.85 \leq b \leq 1.1$, and
$1.8 \leq c \leq 2.1$, and
said positive electrode comprises not more than 3 parts by weight of a conductive agent per 100 parts by weight of said positive electrode active material, wherein said negative electrode comprises a carbon particle, said carbon particle comprises a core particle and an amorphous carbon which covers at least part of the surface of said core particle, and said core particle comprises graphite.

* * * * *